(12) United States Patent
Tamura

(10) Patent No.: US 10,444,897 B2
(45) Date of Patent: Oct. 15, 2019

(54) DISPLAY INPUT DEVICE, IMAGE FORMING APPARATUS INCLUDING SAME, AND METHOD FOR CONTROLLING DISPLAY INPUT DEVICE

(71) Applicant: KYOCERA Document Solutions Inc., Osaka (JP)

(72) Inventor: Takashi Tamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/965,229

(22) Filed: Apr. 27, 2018

(65) Prior Publication Data

US 2018/0335885 A1 Nov. 22, 2018

(30) Foreign Application Priority Data

May 17, 2017 (JP) .................................. 2017-097839

(51) Int. Cl.
G06F 3/041 (2006.01)
G06F 3/01 (2006.01)
H04N 1/00 (2006.01)
G06T 11/60 (2006.01)

(52) U.S. Cl.
CPC ............ *G06F 3/0416* (2013.01); *G06F 3/016* (2013.01); *G06F 3/0414* (2013.01); *H04N 1/00411* (2013.01); *G06T 11/60* (2013.01); *G06T 2200/24* (2013.01)

(58) Field of Classification Search
CPC ........ G06F 3/041; G06F 3/048; G06F 3/0484; G06F 3/0486; G06F 3/0488
See application file for complete search history.

(56) References Cited

U.S. PATENT DOCUMENTS

| 10,268,312 B2* | 4/2019 | Lee ........................ G06F 3/0416 |
| 2011/0124376 A1* | 5/2011 | Kim ...................... G06F 1/1626 455/566 |
| 2016/0357305 A1* | 12/2016 | Wells ..................... G06F 3/0416 |
| 2017/0212677 A1* | 7/2017 | Lee ........................ G06F 3/0418 |
| 2018/0024656 A1* | 1/2018 | Kim ...................... G06F 3/0414 345/174 |

FOREIGN PATENT DOCUMENTS

JP 2016-95576 A 5/2016

* cited by examiner

*Primary Examiner* — William Lu
(74) *Attorney, Agent, or Firm* — Stein IP, LLC

(57) ABSTRACT

Provided is a display input device, which determines whether or not a touch pressing force is a threshold value or more when a touched position on the touch panel display is within a display region of a gadget. When the touch pressing force is less than the threshold value, the touch operation is recognized to be an operation aimed at the gadget. When the touch pressing force is the threshold value or more, and when a software button for which a region including the touched position is set as a display region exists as a component of an operation screen, the touch operation is recognized to be an operation aimed at the software button.

5 Claims, 8 Drawing Sheets

FIG.7
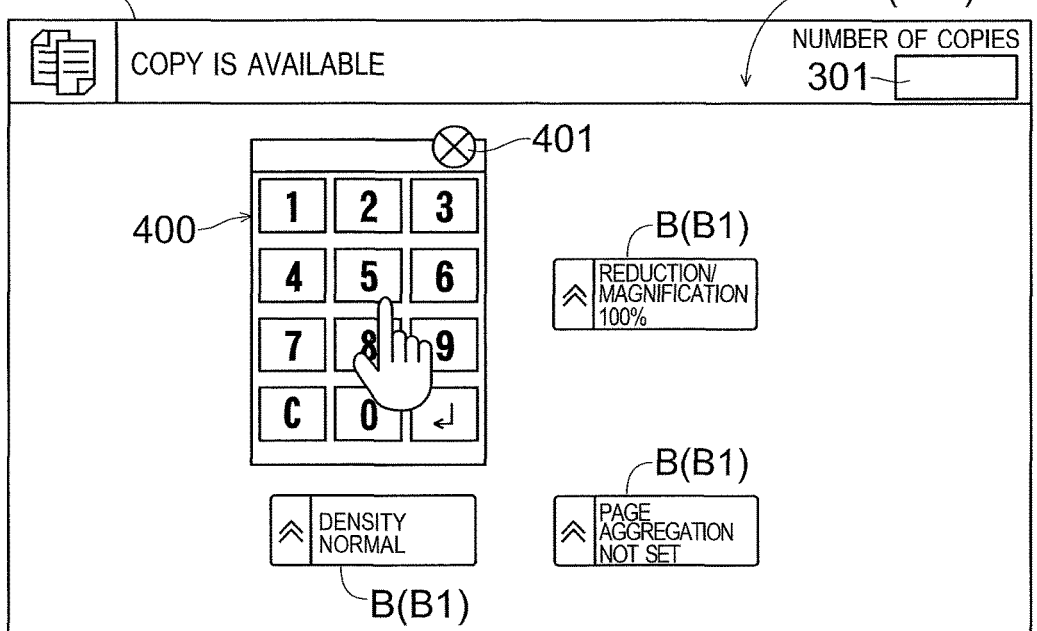
DISPLAY STOP PROCESS
(FIRST PROCESS)
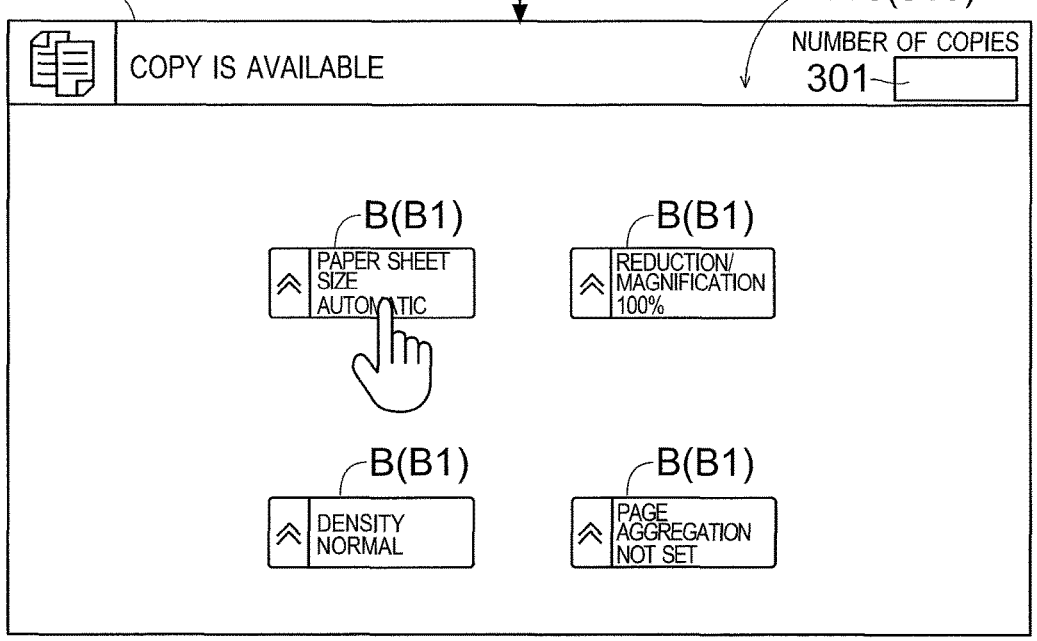

FIG.8
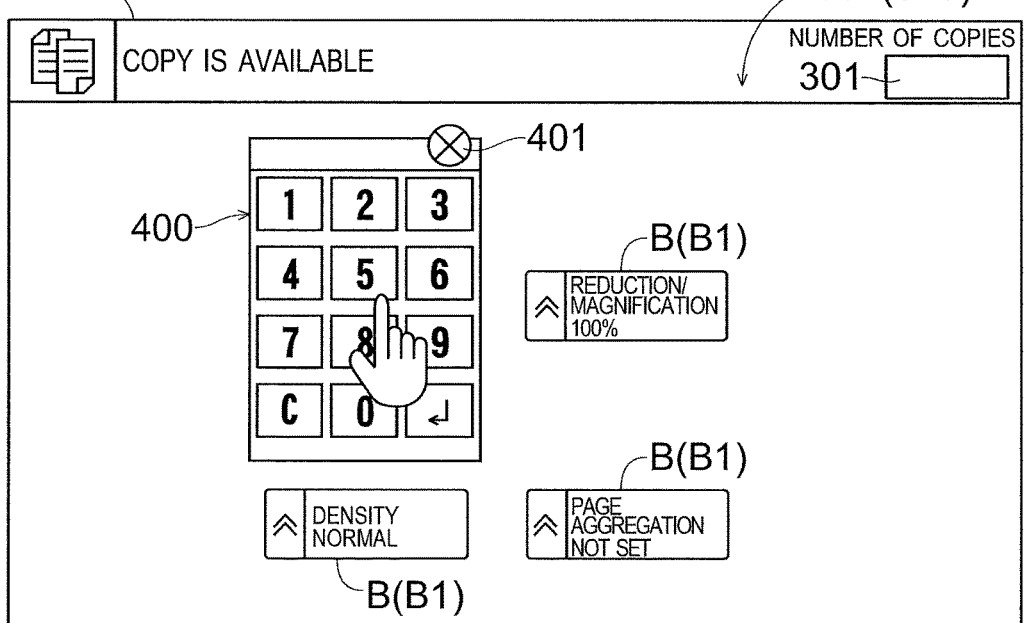
DISPLAY STOP PROCESS
(SECOND PROCESS)
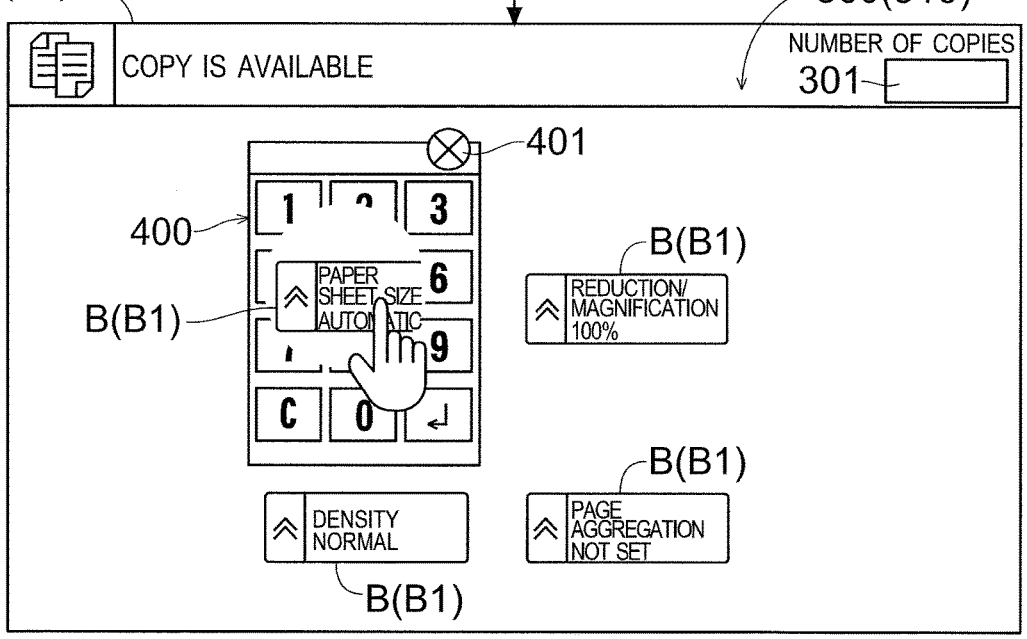

DISPLAY INPUT DEVICE, IMAGE FORMING APPARATUS INCLUDING SAME, AND METHOD FOR CONTROLLING DISPLAY INPUT DEVICE

INCORPORATION BY REFERENCE

This application is based upon and claims the benefit of priority from the corresponding Japanese Patent Application No. 2017-097839 filed May 17, 2017, the entire contents of which are hereby incorporated by reference.

BACKGROUND

The present disclosure relates to a display input device, an image forming apparatus including the same, and a method for controlling the display input device.

An image forming apparatus such as a multifunction peripheral is equipped with a display input device (called an operation panel or the like). The display input device includes a touch panel display. The touch panel display displays an operation screen for accepting an operation for setting an execution condition of a job to be executed in the image forming apparatus. Further, when setting the execution condition of the job, a user performs a touch operation (tap operation), a gesture operation (such as a flick operation), or the like with the operation screen.

In addition, some display input devices can display a gadget on the operation screen in a superimposing manner. For example, a memo (slip), a calendar, a calculator, or the like can be superimposedly displayed as a gadget on the operation screen.

SUMMARY

A display input device according to a first aspect of the present disclosure includes a touch panel display and a control unit. The touch panel display displays an operation screen. The control unit recognizes a touch operation performed to the touch panel display. When the control unit detects that a touched position of the touch operation on the touch panel display is within a display region of a gadget in a state where the touch panel display superimposedly displays the gadget on the operation screen, the control unit determines whether or not a touch pressing force of the touch operation is a predetermined threshold value or more. The control unit recognizes that the touch operation is aimed at the gadget when the touch pressing force is less than the threshold value, and recognizes that the touch operation is aimed at a software button when the touch pressing force is the threshold value or more and when the software button for which a region including the touched position is set as a display region exists as a component of the operation screen.

An image forming apparatus according to a second aspect of the present disclosure includes the display input device described above.

A method for controlling a display input device according to a third aspect of the present disclosure is a method for controlling a display input device including a touch panel display for displaying an operation screen. The method includes the steps of determining whether or not a touch pressing force of a touch operation is a predetermined threshold value or more when a touched position of the touch operation on the touch panel display is within a display region of a gadget in a state where the touch panel display superimposedly displays the gadget on the operation screen, recognizing that the touch operation is aimed at the gadget when the touch pressing force is less than the threshold value, and recognizing that the touch operation is aimed at a software button when the touch pressing force is the threshold value or more, and when the software button for which a region including the touched position is set as a display region exists as a component of the operation screen.

BRIEF DESCRIPTION OF THE DRAWINGS

FIG. 7 is a diagram for describing a display stop process (first process) performed by the operation panel according to one embodiment of the present disclosure.

FIG. 8 is a diagram for describing a display stop process (second process) performed by the operation panel according to one embodiment of the present disclosure.

DETAILED DESCRIPTION

<Basic Structure of Image Forming Apparatus>

Figure 1:
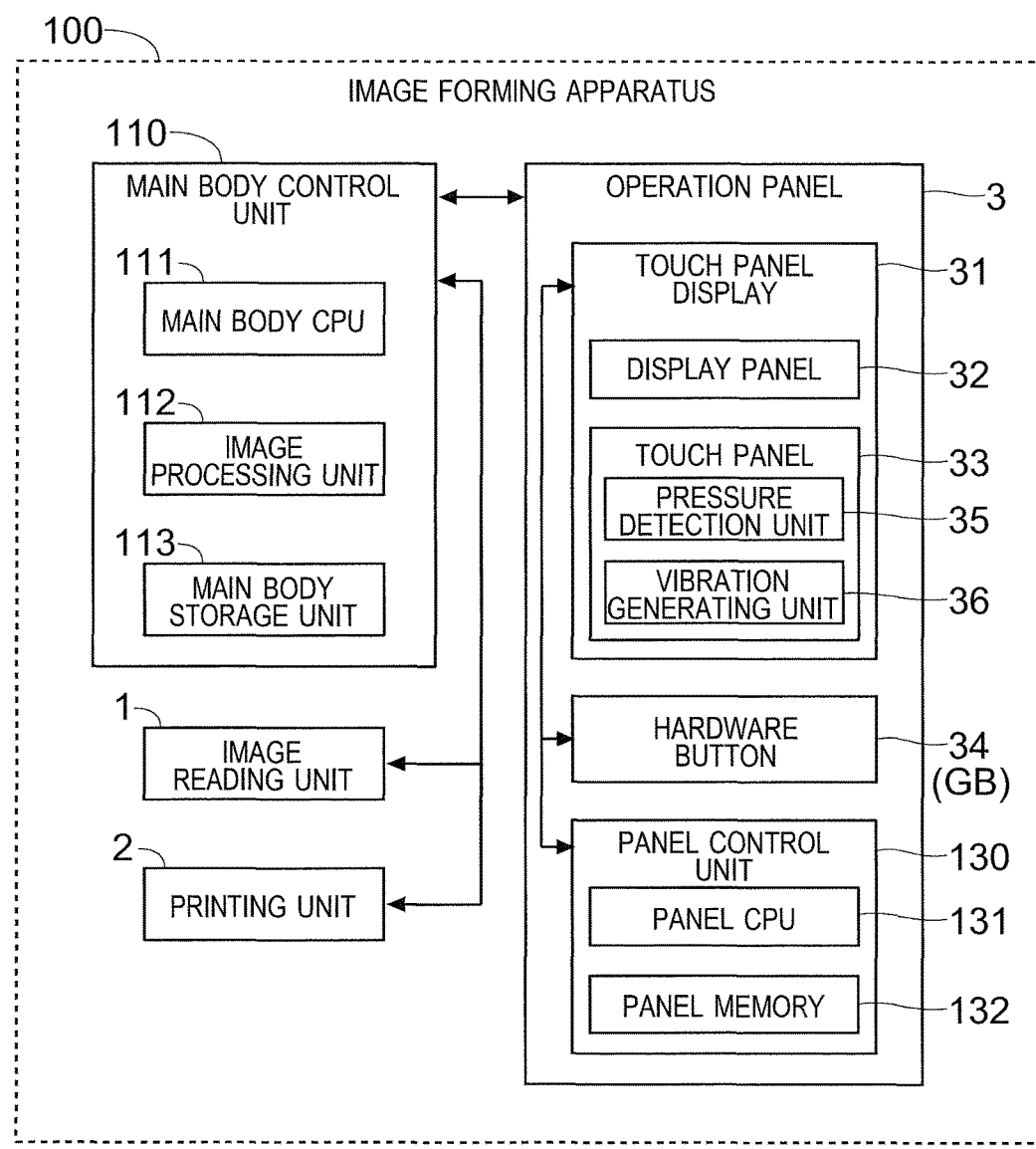
FIG. 1 is a diagram showing a structure of an image forming apparatus including an operation panel according to one embodiment of the present disclosure.

As shown in FIG. 1, an image forming apparatus 100 of this embodiment includes an image reading unit 1 and a printing unit 2. The image reading unit 1 reads a document and generates image data of the document. The printing unit 2 prints an image based on image data (e.g. image data of the document obtained by reading the document with the image reading unit 1) on a paper sheet.

In addition, the image forming apparatus 100 includes a main body control unit 110. The main body control unit 110 includes a main body CPU 111, an image processing unit 112, and a main body storage unit 113. The image processing unit 112 performs various image processings on the image data. The main body storage unit 113 stores a program for controlling operations of individual units of the image forming apparatus 100, a program for controlling image processing, data necessary for various controls, and the like. The main body control unit 110 controls operations of the image reading unit 1 and the printing unit 2 based on the programs and data stored in the main body storage unit 113, and performs image processing on the image data.

<Structure of Operation Panel>

Figure 2:
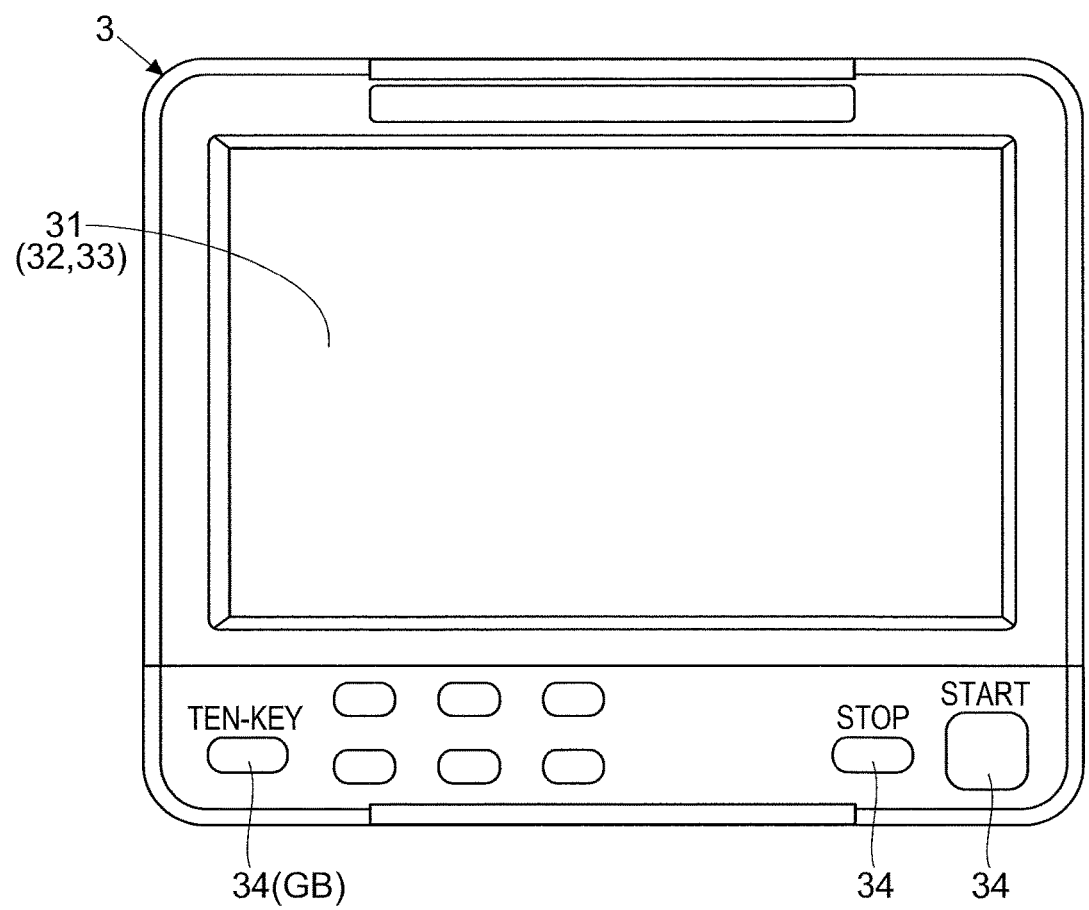
FIG. 2 is a diagram showing an external view of the operation panel according to one embodiment of the present disclosure.

The image forming apparatus 100 includes an operation panel 3 as shown in FIG. 2. The operation panel 3 corresponds to a "display input device". Note that the operation panel 3 shown in FIG. 2 is an example, and the shape or the like of the operation panel 3 is not particularly limited.

As shown in FIGS. 1 and 2, the operation panel 3 includes a touch panel display 31. The touch panel display 31 includes a display panel 32 and a touch panel 33. The display panel 32 is a liquid crystal display panel. The touch panel 33 is disposed on a surface of the display panel 32. The touch panel display 31 displays a screen on the display panel 32, which includes software buttons for accepting various settings, and messages. In addition, the touch panel display 31 accepts operations from a user via the touch panel 33.

For example, when the image forming apparatus 100 executes a job, the touch panel display 31 displays a screen for setting about the job. Then, the touch panel display 31 accepts the setting about the job. In addition, the touch panel display 31 displays a message for notifying a state of the image forming apparatus 100 (for example, remaining amount of paper sheets, remaining amount of toner, or the like).

Note that the operation panel 3 is also provided with various hardware buttons 34 such as a start button for accepting a job execution instruction from the user and a stop button for accepting a job stop instruction from the user.

The operation panel 3 includes a panel control unit 130. The panel control unit 130 corresponds to a "control unit". The panel control unit 130 includes a panel CPU 131 and a panel memory 132 (such as a ROM and a RAM). The panel memory 132 stores a display program for displaying a screen on the touch panel display 31 and screen data of the screen to be displayed on the touch panel display 31.

The panel control unit 130 is connected to the main body control unit 110, receives instructions from the main body control unit 110, and controls the operation panel 3. For example, the panel control unit 130 detects an operation performed to the operation panel 3 (a touch operation to the touch panel display 31 or an operation to the hardware button 34). Then, the panel control unit 130 controls the touch panel display 31 to perform a process corresponding to the operation to the operation panel 3. In addition, the panel control unit 130 informs the main body control unit 110 of operation information indicating content of the operation to the operation panel 3.

In order to recognize content of the touch operation to the touch panel display 31 (an operated software button), the panel control unit 130 detects a touched position (coordinates) of the touch operation on the touch panel display 31, based on an output of the touch panel 33. For example, information indicating a correspondence between the output of the touch panel 33 and the touched position is stored in the panel memory 132 in advance. When the panel control unit 130 detects the touched position, it compares the detected touched position with screen data of the display screen so as to recognize a software button displayed at the touched position (recognized that the software button is operated).

In addition, the panel control unit 130 detects a touch pressing force of the touch operation to the touch panel display 31. For example, the touch panel display 31 includes a pressure detection unit 35. The pressure detection unit 35 includes a plurality of (e.g. four) strain gauge type pressure sensors. The pressure sensors are disposed in the touch panel 33. When detecting a touch operation to the touch panel display 31, the panel control unit 130 determines an average value of output values of the pressure sensors of the pressure detection unit 35 as the touch pressing force. The panel control unit 130 detects the touch pressing force (detects temporal variation of the touch pressing force) until the touch operation to the touch panel display 31 is released.

Further, the touch panel display 31 is provided with a vibration generating unit 36. The vibration generating unit 36 includes a plurality of piezoelectric elements and a driving circuit for applying a drive voltage to each of the piezoelectric elements. The panel control unit 130 is connected to the vibration generating unit 36 and controls the drive voltage from the driving circuit to each piezoelectric element so that each piezoelectric element is driven at an appropriate timing. When each piezoelectric element is driven, the touch panel display 31 is vibrated.

<Display Screen of Operation Panel>

Figure 3:
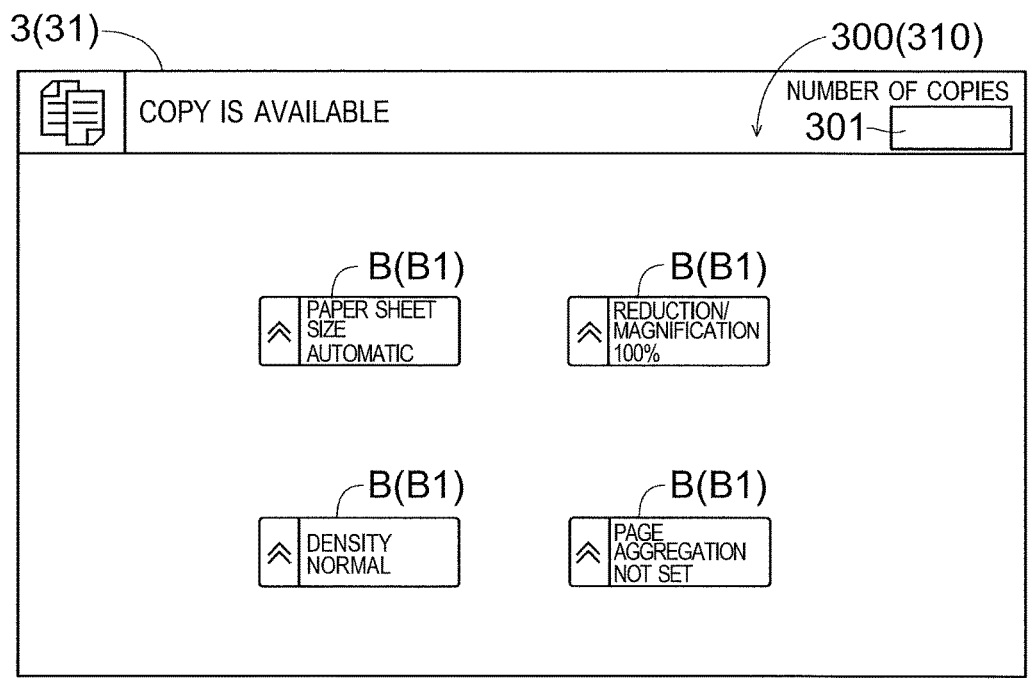
FIG. 3 is a diagram showing a display screen of the operation panel according to one embodiment of the present disclosure.
Figure 4:
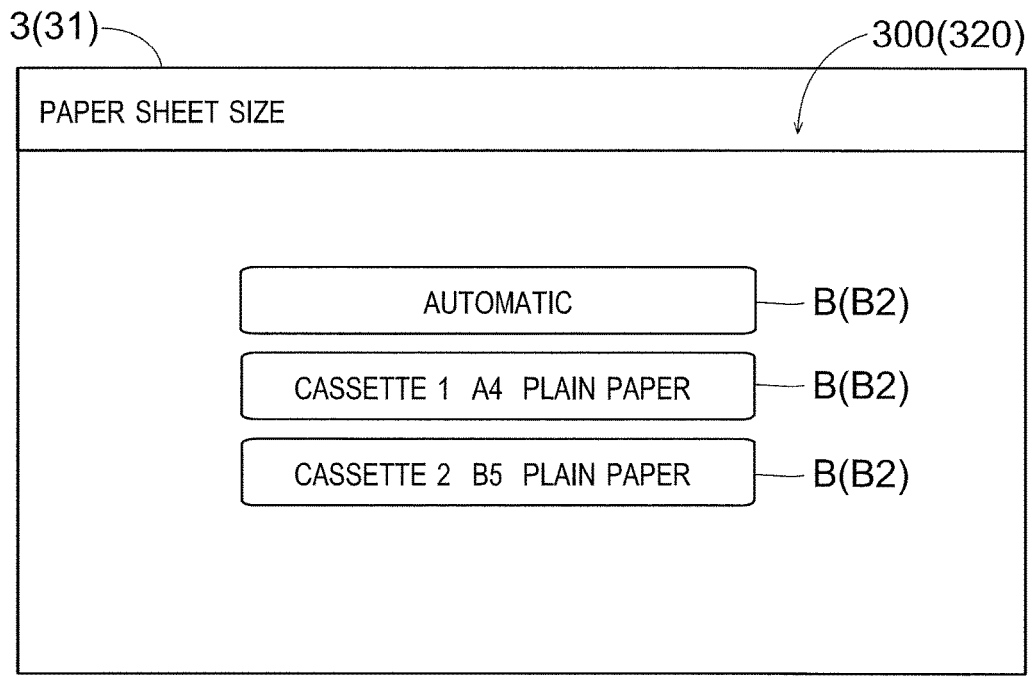
FIG. 4 is a diagram showing a display screen of the operation panel according to one embodiment of the present disclosure.

The operation panel 3 displays an operation screen 300 as shown in FIGS. 3 and 4 and accepts a setting operation, a selecting operation, or the like from the user. The operation screen 300 displayed on the operation panel 3 includes software buttons B as components (screen elements). Various number of software buttons B, i.e. a single or a plurality of software buttons B are arranged in the operation screen 300.

The operation screen 300 (310) shown in FIG. 3 is a screen for accepting setting items designated by the user (setting items for which set values are changed from default values) among a plurality of setting items that can be set as the execution condition for a copy job, such as a paper sheet size and density, and it includes a plurality of item selection buttons B1 as the software buttons B, which correspond to the plurality of setting items, respectively. With the operation screen 310, the selecting operation for selecting the setting item is accepted.

The operation screen 300 (320) shown in FIG. 4 is a screen for accepting setting of size of the paper sheet to be used for the copy job from the user, and it includes a plurality of size setting buttons B2 as the software buttons B, which correspond to a plurality of paper sheet sizes. With the operation screen 320, the setting operation for setting the paper sheet size is accepted.

When detecting a touch in one of display regions of the plurality of software buttons B, the panel control unit 130 recognizes the software button B displayed at the detected touched position as the operation target (recognizes that the detected touch operation is aimed at the software button B). After that, when detecting that the touch operation performed at the display region of the software button B of the operation target is released, the panel control unit 130 performs a process assigned to the software button B of the operation target.

For example, in the operation screen 310 shown in FIG. 3, it is supposed that the display region of the software button B labeled as paper sheet size (hereinafter may be referred to as a paper sheet size button B) is touched and then the touch operation is released. In this case, the panel control unit 130 performs a process of displaying the operation screen 320 shown in FIG. 4 on the touch panel display 31. In this way, the operation screen 320 is displayed on the touch panel display 31, and hence the user can set the paper sheet size.

<Display of Gadget>

The operation panel 3 is provided with a gadget button GB (see FIG. 2) as the hardware button 34, for accepting an operation for starting a gadget program working on the operation screen 300 from the user. When detecting the operation to the gadget button GB, the panel control unit 130 controls the touch panel display 31 to display a gadget for using a function of the gadget program (graphical user interface (GUI) image). In this case, the touch panel display 31 superimposedly displays the gadget on the operation screen 300. Note that the gadget may also be called a widget.

Figure 5:
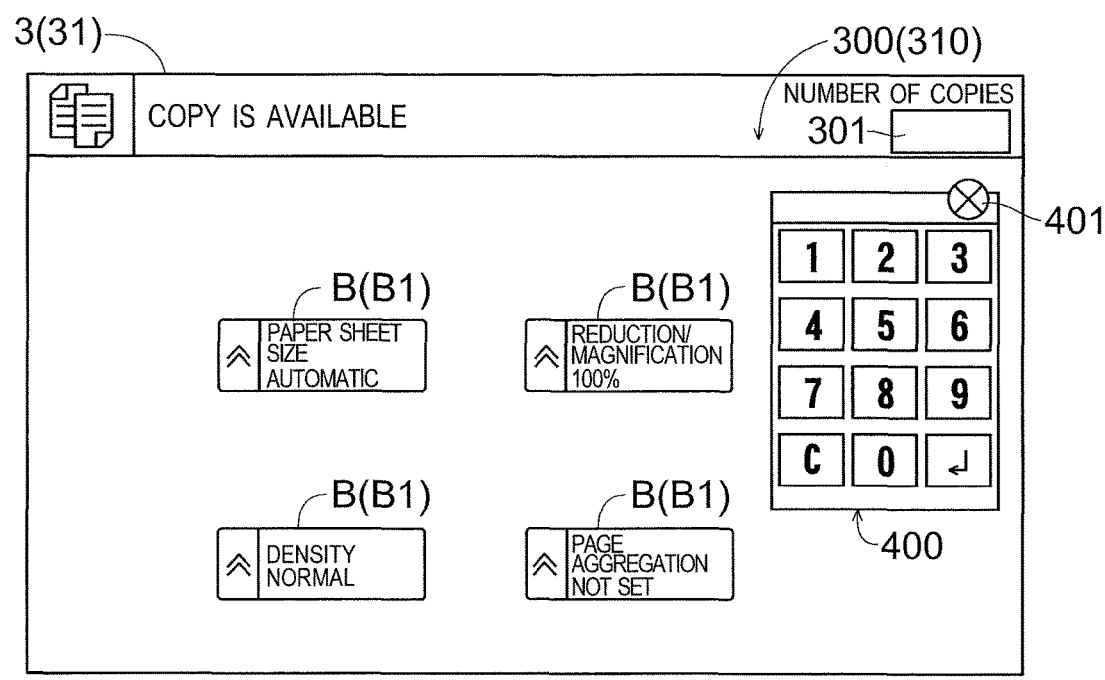
FIG. 5 is a diagram showing a gadget superimposedly displayed on a display screen of the operation panel according to one embodiment of the present disclosure.

For example, as shown in FIG. 5, a ten-keyboard gadget 400 for accepting numeric input operation from the user is superimposedly displayed on the operation screen 300. When the gadget 400 is displayed on the operation screen 300 including a numeric input field 301 (field for inputting the number of copies in FIG. 5) as a component, a numeric value can be input to the numeric input field 301 by operation to the gadget 400.

Note that a type of the gadget superimposedly displayed on the operation screen 300 is not particularly limited. Although not illustrated, other than the ten-keyboard gadget 400, a gadget such as a calculator, a memo (slip), or a timer may be superimposedly displayed on the operation screen 300.

Further, in the example shown in FIG. 5, the gadget 400 superimposedly displayed on the operation screen 300 does not overlap with the software button B on the operation screen 300. In other words, there is no software button B of the operation screen 300 in the display region of the gadget 400.

In this case, when the panel control unit 130 detects that the touched position on the touch panel display 31 is within the display region of the gadget 400, it recognizes that the touch operation to the touch panel display 31 is aimed at the gadget 400. After that, when detecting that the touch operation to the touch panel display 31 is released, the panel control unit 130 determines that the touch operation to the touch panel display 31 is an effective operation aimed at the gadget 400 and performs a process corresponding to content of the operation of the gadget 400. When the process is performed by the panel control unit 130, a numeric value is input to the numeric input field 301 (or the numeric value input to the numeric input field 301 is changed).

Figure 6:
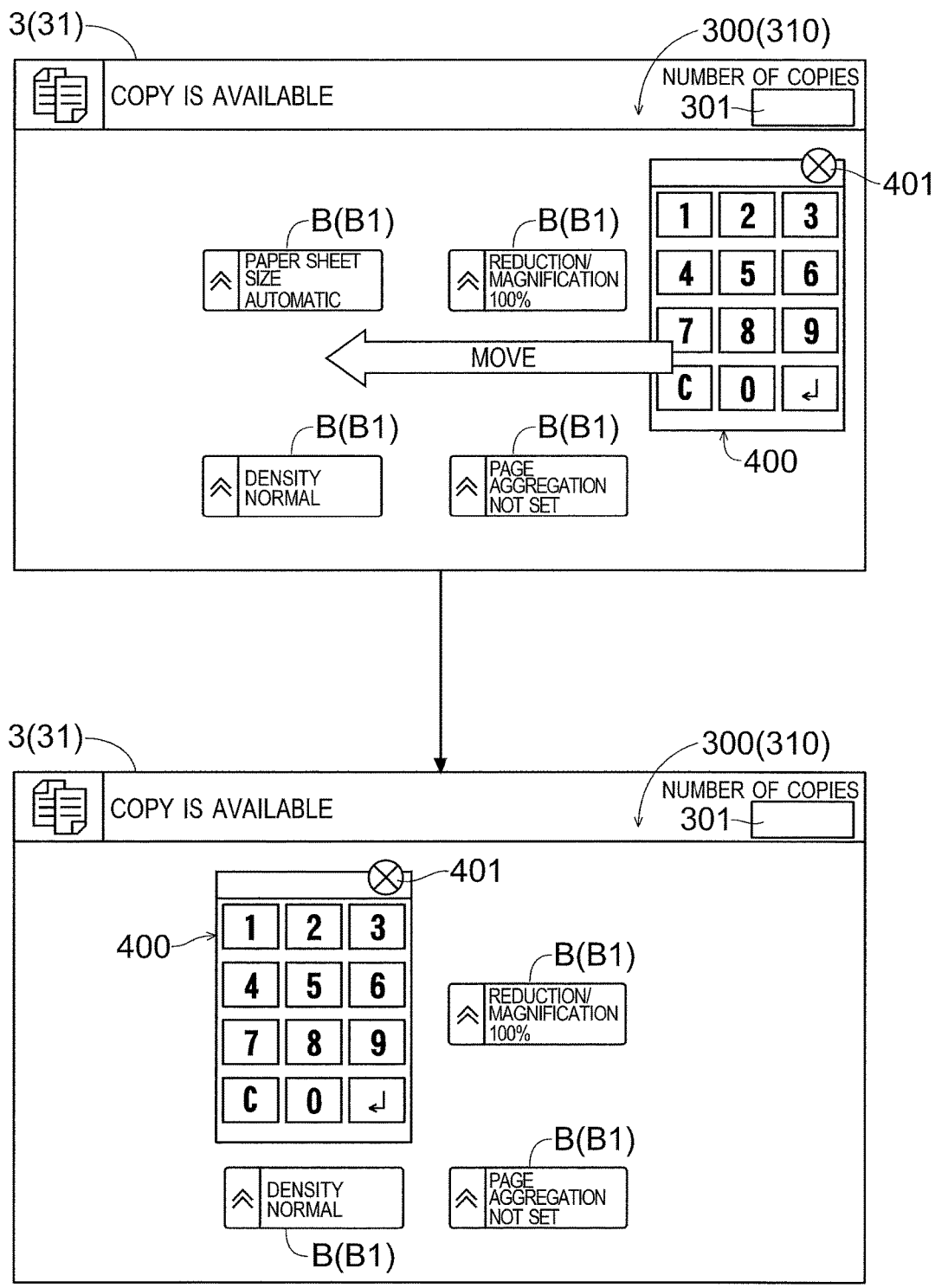
FIG. 6 is a diagram showing a state where the gadget, which is superimposedly displayed on the display screen of the operation panel according to one embodiment of the present disclosure, overlaps with a software button.

Further, the display position of the gadget 400 on the operation screen 300 can be changed. The position change of the gadget 400 can be performed by a drag-and-drop operation. Because the display position of the gadget 400 on the operation screen 300 can be changed in this way, the gadget 400 may be moved to a position overlapping with the software button B on the operation screen 300 as shown in FIG. 6. In this case, the software button B overlapping with the gadget 400 becomes non-displayed entirely or partly (a part overlapping with the gadget 400).

For example, it is supposed that the gadget 400 overlaps with the paper sheet size button B so that the paper sheet size button B becomes non-displayed. In this case, by moving the display position of the gadget 400 (e.g. by restoring the state of the upper part in FIG. 6 from the state of the lower part in FIG. 6), the paper sheet size button B is displayed again. In this way, an operation to the paper sheet size button B can be performed. Note that also when the display of the gadget 400 is stopped, the paper sheet size button B is displayed again. For example, by performing an operation to a stop button 401 of the gadget 400, the display of the gadget 400 can be stopped. Alternatively, also when the operation is performed again to the gadget button GB in the state where the gadget 400 is displayed, the display of the gadget 400 can be stopped.

However, it is troublesome for the user to perform the operation of moving the gadget 400 or the operation of stopping the display of the gadget 400.

Therefore, when the panel control unit 130 detects that the touched position on the touch panel display 31 is within the display region of the gadget 400 in the state where the gadget 400 is superimposedly displayed on the operation screen 300 by the touch panel display 31, it determines whether or not the touch pressing force to the touch panel display 31 is a predetermined threshold value or more. Further, when it is determined that the touch pressing force to the touch panel display 31 is not the threshold value or more (i.e., is less than the threshold value), the panel control unit 130 recognizes that the touch operation to the touch panel display 31 is aimed at the gadget 400.

On the other hand, when it is determined that the touch pressing force to the touch panel display 31 is the threshold value or more, the panel control unit 130 recognizes that the touch operation to the touch panel display 31 is not aimed at the gadget 400. In this case, when the software button B for which a region including the touched position on the touch panel display 31 is set as a display region exists as a component of the operation screen 300, the panel control unit 130 recognizes that the touch operation to the touch panel display 31 is aimed at the software button B.

In addition, when the touched position on the touch panel display 31 is within the display region of the gadget 400, and when the touch pressing force is the threshold value or more, the panel control unit 130 controls the touch panel display 31 to perform display stop process (first process) for stopping display of the entire of the gadget 400. Alternatively, the panel control unit 130 controls the touch panel display 31 to perform display stop process (second process) for stopping display of a part of the gadget 400 corresponding to the touched position (including vicinity of the touched position).

For example, it is supposed that the touch operation to the display region of the gadget 400 (region corresponding to the paper sheet size button B) is performed from the state of the lower part of FIG. 6. In addition, it is supposed that the touch pressing force is the threshold value or more. In this example, when the first process is performed as the display stop process, display of the entire of the gadget 400 is stopped as shown in FIG. 7. When the second process is performed as the display stop process, display of a part corresponding to the touched position in the gadget 400 is only stopped as shown in FIG. 8. In FIGS. 7 and 8, the touched position is shown by hand image (tip of the forefinger is the touched position).

In addition, when the touched position on the touch panel display 31 is within the display region of the gadget 400, and the touch pressing force is the threshold value or more, the panel control unit 130 controls the vibration generating unit 36 to generate vibration. In this way, the touch panel display 31 is generated. Further, in this case, the vibration of the touch panel display 31 is transmitted to the user.

Note that a sound output unit that reproduces sound data to output sound may be disposed in the operation panel 3. Further, when the touched position on the touch panel display 31 is within the display region of the gadget 400, and when the touch pressing force is the threshold value or more, a predetermined notification sound may be output from the sound output unit. Although not particularly limited, a sound like cracking of an object may be output from the sound output unit.

Figure 9:
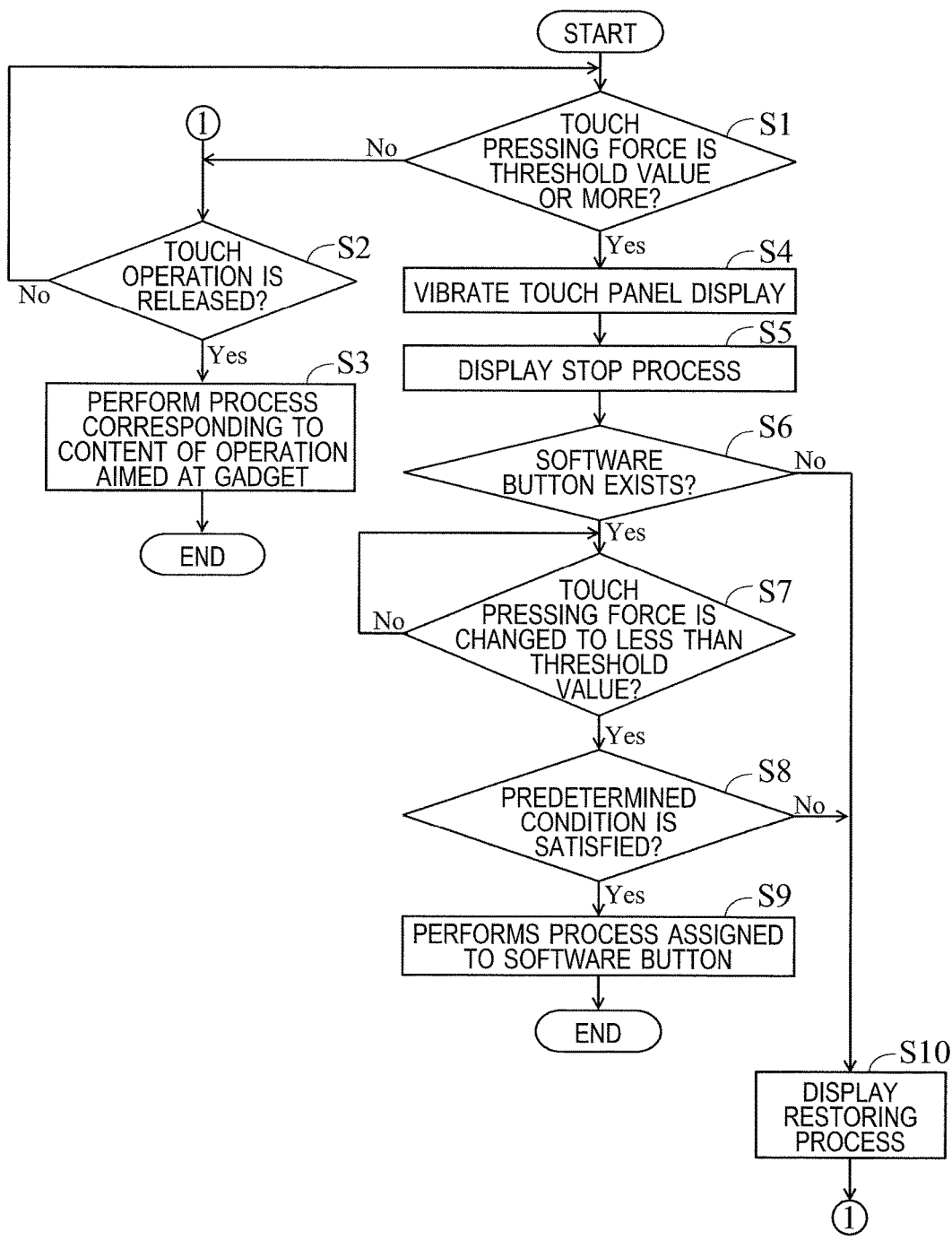
FIG. 9 is a diagram showing a flow of an operation recognition process performed by the operation panel according to one embodiment of the present disclosure.

Hereinafter, with reference to a flowchart shown in FIG. 9, a flow of an operation recognition process performed by the panel control unit 130 (process of recognizing the operation based on the touch pressing force) is described. At a start time point of the flowchart shown in FIG. 9, it is supposed that the touch panel display 31 superimposedly displays the gadget 400 on the operation screen 300. Further, in this state, a touch operation is performed to the touch panel display 31, and when the panel control unit 130 detects that the touched position on the touch panel display 31 is within the display region of the gadget 400, the flowchart shown in FIG. 9 starts.

In Step S1, the panel control unit 130 determines whether or not the touch pressing force is the threshold value or more (or whether or not the touch pressing force is changed from less than the threshold value to the threshold value or more). As a result, when the panel control unit 130 determines that the touch pressing force is not the threshold value or more (less that the threshold value), the process proceeds to Step S2. In this case, the panel control unit 130 recognizes that the touch operation to the touch panel display 31 is aimed at the gadget 400.

After proceeding to Step S2, the panel control unit 130 determines whether or not the touch operation is released without the touch pressing force becoming the threshold value or more. As a result, in case where the panel control unit 130 determines that the touch operation is released, the process proceeds to Step S3. In case where the panel control unit 130 determines that the touch operation is not released, the process proceeds to Step S1.

After proceeding to Step S3, the panel control unit 130 determines that the touch operation to the touch panel display 31 is an effective operation aimed at gadget 400 and performs a process corresponding to content of the operation aimed at the gadget 400. In this case, because the touch pressing force is less than the threshold value, the display stop process of stopping the display of the gadget 400 is not performed.

In Step S1, when the panel control unit 130 determines that the touch pressing force is the threshold value or more (or that the touch pressing force is changed from less than the threshold value to the threshold value or more), the process proceeds to Step S4. In this case, the panel control unit 130 recognizes that the touch operation to the touch panel display 31 is not aimed at the gadget 400.

After proceeding to Step S4, the panel control unit 130 controls the vibration generating unit 36 so that the touch panel display 31 is temporarily vibrated. In addition, in Step S5, the panel control unit 130 controls the touch panel display 31 to perform the display stop process (the first process or the second process). In case where the operation panel 3 is provided with the sound output unit, the sound output unit outputs the notification sound at this time.

In Step S6, the panel control unit 130 determines whether or not the software button B for which the region including the touched position is set as a display region (the software button B that is not displayed entirely or partly because the gadget 400 is superimposedly displayed on the operation screen 300) exists as a component of the operation screen 300. As a result, when the panel control unit 130 determines that the software button B exists, the process proceeds to Step S7. In this case, the panel control unit 130 recognizes that the touch operation to the touch panel display 31 is an operation aimed at the software button B. In the following description, the software button B is referred to as a target button B and is discriminated from other software buttons B.

After proceeding to Step S7, the panel control unit 130 determines whether or not the touch pressing force is changed from the threshold value or more to less than the threshold value. As a result, in case where the panel control unit 130 determines that the touch pressing force has become less than the threshold value, the process proceeds to Step S8. In case where the panel control unit 130 determines that the touch pressing force has not become less than the threshold value, the process of Step S7 (determination by the panel control unit 130) is repeated.

After proceeding to Step S8, the panel control unit 130 determines whether or not a predetermined condition is satisfied. As a result, in case where the panel control unit 130 determines that the predetermined condition is satisfied, the process proceeds to Step S9. Further, the panel control unit 130 determines that the predetermined condition is satisfied in case where the touch operation is released before a predetermined time elapses after the touch pressing force becomes less than the threshold value. After proceeding to Step S9, the panel control unit 130 determines that the touch operation to the touch panel display 31 is an effective operation aimed at the target button B and performs a process assigned to the target button B.

In Step S8, when the panel control unit 130 determines that the predetermined condition is not satisfied, the process proceeds to Step S10. Note that the panel control unit 130 determines that the predetermined condition is not satisfied in case where a predetermined time elapses without the touch operation being released after the touch pressing force becomes less than the threshold value. In this case, the panel control unit 130 determines that the operation aimed at the target button B is cancelled, and recognizes that the touch operation to the touch panel display 31 is an operation aimed at the gadget 400.

After proceeding to Step S10, the panel control unit 130 controls the touch panel display 31 to perform a display restoring process of restoring an original display state of the gadget 400 (process of display the entire of the gadget 400). Note that also when the panel control unit 130 determines in Step S6 that the target button B does not exist, the process proceeds to Step S10. After that, the process proceeds to Step S2.

As described above, the operation panel 3 (display input device) of this embodiment includes the touch panel display 31 for displaying the operation screen 300 and the panel control unit 130 (control unit) that recognizes a touch operation performed to the touch panel display 31. When the panel control unit 130 detects that a touched position of the touch operation on the touch panel display 31 is within the display region of the gadget 400 in the state where the touch panel display 31 superimposedly displays the gadget 400 on the operation screen 300, the panel control unit 130 determines whether or not a touch pressing force of the touch operation is a predetermined threshold value or more. When the touch pressing force is less than the threshold value, the panel control unit 130 recognizes that the touch operation is aimed at the gadget 400. On the contrary, when the touch pressing force is the threshold value or more, and when the software button B for which the region including the touched position is set as a display region exists as a component of the operation screen 300, the panel control unit 130 recognizes that the touch operation is aimed at the software button B.

In the structure of this embodiment, in the case where the software button B as a component of the operation screen 300 overlaps with the gadget 400 (when the software button B is not displayed), when the touch operation is performed with weak pressing force less than the threshold value at a position within the display region of the gadget 400, the touch operation is recognized as an operation aimed at the gadget 400. On the other hand, when the touch operation is performed with a strong pressing force of the threshold value or more at a position within the display region of the gadget 400, the touch operation is recognized as an operation aimed at the software button B overlapping with the gadget 400. In this way, the operation to the software button B overlapping with the gadget 400 can be performed (easily) without additional operation of stopping the display of the gadget 400 or moving the gadget 400. As a result, convenience of the user is improved.

In addition, as described above, in this embodiment, when the touched position on the touch panel display 31 is within the display region of the gadget 400 and the touch pressing force is the threshold value or more, the panel control unit 130 controls the touch panel display 31 to perform the display stop process of stopping display of the entire of the gadget 400 or a part thereof corresponding to the touched position. In this way, the software button B overlapping with the gadget 400 (software button B that was not displayed because of the display of the gadget 400) is displayed, and hence the user can recognize the software button B that the user wants to operate. As a result, user's operation error can be prevented.

In addition, as described above, in this embodiment, after the panel control unit 130 recognizes that the touch operation performed at a position within the display region of the gadget 400 is an operation aimed at the software button B overlapping with the gadget 400, when the touch operation is released before a predetermined time elapses after the touch pressing force becomes less than the threshold value, the panel control unit 130 performs the process assigned to the software button B overlapping with the gadget 400. On the other hand, after the panel control unit 130 recognizes that the touch operation performed at a position within the display region of the gadget 400 is an operation aimed at the software button B overlapping with the gadget 400, when the predetermined time elapses after the touch pressing force becomes less than the threshold value without the touch operation being released, the panel control unit 130 determines that the operation aimed at the software button B overlapping with the gadget 400 is cancelled, and recognizes that the touch operation performed at a position within the display region of the gadget 400 is aimed at the gadget 400. In this way, even when the touch operation is performed with a strong pressing force of the threshold value or more at a position within the display region of the gadget 400, so that the touch operation is recognized as an operation aimed at the software button B overlapping with the gadget 400, the operation aimed at the software button B overlapping with the gadget 400 can be easily cancelled. As a result, convenience of the user can be improved.

In addition, as described above, in this embodiment, when the touch pressing force at a position within the display region of the gadget 400 is the threshold value or more, the panel control unit 130 controls the vibration generating unit 36 to vibrate the touch panel display 31. In this way, the user can recognize whether or not the touch operation to the touch panel display 31 is performed with a pressing force of the threshold value or more, and hence convenience of the user can be achieved.

The embodiment disclosed in this specification is merely an example in every aspect and should not be interpreted as a limitation. The scope of the present disclosure is defined not by the above description of the embodiment but by the claims, and further includes all modifications within meanings and scopes equivalent to the claims.

What is claimed is:

1. A display input device comprising:
   a touch panel display that displays an operation screen; and
   a control unit that recognizes a touch operation performed to the touch panel display, wherein
   when the control unit detects that a touched position of the touch operation on the touch panel display is within a display region of a gadget in a state where the touch panel display superimposedly displays the gadget on the operation screen, the control unit determines whether or not a touch pressing force of the touch operation is a predetermined threshold value or more,
   the control unit recognizes that the touch operation is aimed at the gadget when the touch pressing force is less than the threshold value, and recognizes that the touch operation is aimed at a software button when the touch pressing force is the threshold value or more and when the software button for which a region including the touched position is set as a display region exists as a component of the operation screen,
   after the control unit recognizes that the touch operation is aimed at the software button, when the touch operation is released before a predetermined time elapses after the touch pressing force becomes less than the threshold value, the control unit performs a process assigned to the software button, and
   after the control unit recognizes that the touch operation is aimed at the software button, when the predetermined time elapses without the touch operation being released after the touch pressing force becomes less than the threshold value, the control unit determines that the touch operation aimed at the software button is cancelled, and recognizes that the touch operation is aimed at the gadget.

2. The display input device according to claim 1, wherein when the touch pressing force is the threshold value or more, the control unit controls the touch panel display to perform a display stop process of stopping display of the entire of the gadget or a part thereof corresponding to the touched position.

3. The display input device according to claim 1, further comprising a vibration generating unit for vibrating the touch panel display, wherein when the touch pressing force is the threshold value or more, the control unit controls the vibration generating unit to vibrate the touch panel display.

4. An image forming apparatus comprising the display input device according to claim 1.

5. A method for controlling a display input device including a touch panel display for displaying an operation screen, the method comprising the steps of:
   determining whether or not a touch pressing force of a touch operation is a predetermined threshold value or more when a touched position of the touch operation on the touch panel display is within a display region of a gadget in a state where the touch panel display superimposedly displays the gadget on the operation screen;
   recognizing that the touch operation is aimed at the gadget when the touch pressing force is less than the threshold value;
   recognizing that the touch operation is aimed at a software button when the touch pressing force is the threshold value or more, and when the software button for which a region including the touched position is set as a display region exists as a component of the operation screen,
   after recognizing that the touch operation is aimed at the software button, when the touch operation is released before a predetermined time elapses after the touch pressing force becomes less than the threshold value, performing a process assigned to the software button, and
   after recognizing that the touch operation is aimed at the software button, when the predetermined time elapses without the touch operation being released after the touch pressing force becomes less than the threshold value, determining that the touch operation aimed at the software button is cancelled, and recognizing that the touch operation is aimed at the gadget.

\* \* \* \* \*